(12) United States Patent
Campbell et al.

(10) Patent No.: US 8,274,014 B2
(45) Date of Patent: *Sep. 25, 2012

(54) FILLER METAL WITH FLUX FOR BRAZING AND SOLDERING AND METHOD OF MAKING AND USING SAME

(75) Inventors: Steven Campbell, Mokena, IL (US); John Scott, New Lenox, IL (US)

(73) Assignee: Bellman-Melcor Development, LLC, Tinley Park, IL (US)

( * ) Notice: Subject to any disclaimer, the term of this patent is extended or adjusted under 35 U.S.C. 154(b) by 1041 days.

This patent is subject to a terminal disclaimer.

(21) Appl. No.: 12/176,126

(22) Filed: Jul. 18, 2008

(65) Prior Publication Data

US 2009/0014093 A1    Jan. 15, 2009

Related U.S. Application Data

(63) Continuation-in-part of application No. 11/753,045, filed on May 24, 2007, now Pat. No. 7,858,204.

(60) Provisional application No. 60/808,416, filed on May 25, 2006.

(51) Int. Cl.
*B23K 35/02* (2006.01)
(52) U.S. Cl. .............. 219/145.1; 219/145.22; 219/146.1
(58) Field of Classification Search ............... 219/145.1, 219/145.22, 146.1; 148/23, 24; 428/358, 428/560, 514; 420/514
See application file for complete search history.

(56) References Cited

U.S. PATENT DOCUMENTS

| | | |
|---|---|---|
| 400,869 A | 4/1889 | Norton et al. |
| 607,504 A | 7/1898 | Crowther |
| 1,629,748 A | 5/1927 | Stoody |
| 1,968,618 A | 2/1932 | Padgett et al. |
| 2,005,189 A | 6/1935 | Herr |
| 2,055,276 A | 9/1936 | Brownsdon et al. |
| 2,499,641 A | 3/1950 | Goody |
| 2,565,477 A | 8/1951 | Crowell et al. |
| 2,927,043 A | 3/1960 | Stetson |
| 2,958,941 A | 11/1960 | Goerg |
| 3,033,713 A | 5/1962 | Bielenberg et al. |
| 3,077,131 A | 2/1963 | McShane |
| 3,162,551 A | 12/1964 | Short |
| 3,198,560 A | 8/1965 | Collins |

(Continued)

FOREIGN PATENT DOCUMENTS

CA    1303605    6/1992

(Continued)

OTHER PUBLICATIONS

S.A. Day, "Material Safety Data Sheet for" Aluminum Flux Cored Wire and Rings, Feb. 23, 2004, pp. 1-5.

(Continued)

*Primary Examiner* — M. Alexandra Elve
(74) *Attorney, Agent, or Firm* — Ungaretti & Harris LLP

(57) ABSTRACT

A wire (10) for use in a brazing or soldering operation has an elongated body (12) of a metallic material. The elongated body (12) has an outer surface (18). A channel (14) is formed along a length of the body. The channel (14) has an opening ($A_1$). A flux solution (22) is deposited within the channel (14) and along the length of the body. The flux solution (22) covers a portion of the outer surface (18). A portion of the flux solution (22) is exposed through the opening ($A_1$) in the channel (14).

14 Claims, 6 Drawing Sheets

U.S. PATENT DOCUMENTS

| | | |
|---|---|---|
| 3,239,125 A | 3/1966 | Sherlock |
| 3,290,772 A | 12/1966 | Crouch |
| 3,542,998 A | 11/1970 | Huff |
| 3,610,663 A | 10/1971 | Lago |
| 3,619,429 A | 11/1971 | Torigai et al. |
| 3,620,830 A | 11/1971 | Kramer |
| 3,620,869 A | 11/1971 | Stump et al. |
| 3,639,721 A | 2/1972 | Hubbel |
| 3,642,998 A | 2/1972 | Jennings |
| 3,695,795 A | 10/1972 | Jossick |
| 3,703,254 A | 11/1972 | Maierson et al. |
| 3,745,644 A | 7/1973 | Moyer et al. |
| 3,935,414 A | 1/1976 | Ballass et al. |
| 3,967,036 A | 6/1976 | Sadowski |
| 3,980,859 A | 9/1976 | Leonard |
| 4,041,274 A | 8/1977 | Sadowski |
| 4,121,750 A * | 10/1978 | Schoer et al. ............... 228/219 |
| 4,301,211 A | 11/1981 | Sloboda |
| 4,379,811 A | 4/1983 | Puschner et al. |
| 4,396,822 A | 8/1983 | Kishida et al. |
| 4,447,472 A | 5/1984 | Minnick et al. |
| 4,493,738 A | 1/1985 | Collier et al. |
| 4,497,849 A | 2/1985 | Hughes et al. |
| 4,571,352 A | 2/1986 | Aoki |
| 4,587,097 A | 5/1986 | Rabinkin et al. |
| 4,624,860 A | 11/1986 | Alber et al. |
| 4,762,674 A | 8/1988 | Cheng et al. |
| 4,785,029 A | 11/1988 | Honma et al. |
| 4,785,092 A | 11/1988 | Nanba et al. |
| 4,800,131 A | 1/1989 | Marshall et al. |
| 4,831,701 A | 5/1989 | Yutaka |
| 4,901,909 A | 2/1990 | George |
| 5,098,010 A | 3/1992 | Carmichael et al. |
| 5,175,411 A | 12/1992 | Barber |
| 5,184,767 A | 2/1993 | Estes |
| 5,280,971 A | 1/1994 | Tokutake et al. |
| 5,316,206 A | 5/1994 | Syslak et al. |
| 5,360,158 A | 11/1994 | Conn et al. |
| 5,418,072 A | 5/1995 | Baldantoni et al. |
| 5,575,933 A | 11/1996 | Ni |
| 5,749,971 A | 5/1998 | Ni |
| 5,759,707 A | 6/1998 | Belt et al. |
| 5,781,846 A | 7/1998 | Jossick |
| 5,791,005 A | 8/1998 | Grabowski et al. |
| 5,806,752 A | 9/1998 | Van Evans et al. |
| 5,820,939 A | 10/1998 | Popoola et al. |
| 5,903,814 A | 5/1999 | Miura et al. |
| 6,093,761 A | 7/2000 | Schofalvi |
| 6,204,316 B1 | 3/2001 | Schofalvi |
| 6,244,397 B1 | 6/2001 | Kars |
| 6,248,860 B1 | 6/2001 | Sant'Angelo et al. |
| 6,264,062 B1 | 7/2001 | Lack et al. |
| 6,277,210 B1 | 8/2001 | Schuster |
| 6,317,913 B1 | 11/2001 | Kilmer et al. |
| 6,344,237 B1 | 2/2002 | Kilmer et al. |
| 6,376,585 B1 | 4/2002 | Schofalvi et al. |
| 6,395,223 B1 | 5/2002 | Schuster et al. |
| 6,409,074 B1 | 6/2002 | Katoh et al. |
| 6,417,489 B1 | 7/2002 | Blankenship et al. |
| 6,426,483 B1 * | 7/2002 | Blankenship et al. ..... 219/145.1 |
| 6,432,221 B1 * | 8/2002 | Seseke-Koyro et al. ........ 148/24 |
| 6,497,770 B2 | 12/2002 | Watsuji et al. |
| 6,608,286 B2 * | 8/2003 | Jiang ..................... 219/145.31 |
| 6,680,359 B2 | 1/2004 | Schoenheider |
| 6,713,593 B2 | 3/2004 | Ree et al. |
| 6,733,598 B2 | 5/2004 | Swidersky et al. |
| 6,830,632 B1 | 12/2004 | Fuerstenau et al. |
| 6,846,862 B2 | 1/2005 | Schofalvi et al. |
| 6,864,346 B2 | 3/2005 | Schoenheider |
| 6,881,278 B2 | 4/2005 | Amita et al. |
| 6,960,260 B2 | 11/2005 | Goto |
| 7,267,187 B2 | 9/2007 | Kembaiyan |
| 7,337,941 B2 | 3/2008 | Scott et al. |
| 7,442,877 B2 | 10/2008 | Kamata et al. |
| 2002/0020468 A1 | 2/2002 | Schuster et al. |
| 2003/0203137 A1 | 10/2003 | Teshima et al. |
| 2004/0171721 A1 | 9/2004 | Esemplare |
| 2005/0089440 A1 | 4/2005 | Kembaiyan |
| 2007/0093574 A1 | 4/2007 | Esemplare |
| 2007/0251602 A1 | 11/2007 | Gagnon, Jr. et al. |
| 2009/0101238 A1 | 4/2009 | Jossick et al. |

FOREIGN PATENT DOCUMENTS

| | | |
|---|---|---|
| FR | 7612546 | 11/1977 |
| GB | 1180735 | 2/1970 |
| GB | 1481140 A | 7/1977 |
| JP | 63040697 | 2/1988 |
| JP | 63303694 | 12/1988 |
| JP | 01066093 | 3/1989 |
| WO | 99/00444 | 1/1999 |
| WO | 00/39172 | 7/2000 |
| WO | 00/52228 | 9/2000 |
| WO | 00/64626 | 11/2000 |
| WO | 02/00569 | 1/2002 |
| WO | 02/31023 | 4/2002 |
| WO | 03/068447 | 8/2003 |
| WO | 03/089176 | 10/2003 |
| WO | 2004/061871 | 7/2004 |
| WO | 2004/094328 | 11/2004 |
| WO | WO-2007/058969 A2 | 5/2007 |

OTHER PUBLICATIONS

S.A. Day, "Material Safety Data Sheet for" Flux Coating Part 'A', May 2, 2006, pp. 1-6.

S.A. Day, "Material Safety Data Sheet for" Flux Coating Part 'B', May 2, 2006, pp. 1-3.

"International Search Report for PCT/US07/69636 mailed Nov. 8, 2007".

Bellman-Melcor Development, LLC, First Office Action issued Dec. 17, 2010 from the Chinese Patent Office in co-pending Chinese Application No. 2007800274866.

International Search Report dated Dec. 21, 2007, for PCT/US06/043856, filed Nov. 9, 2006.

Written Opinion of the International Searching Authority dated May 10, 2008 for PCT/US06/043856, filed Nov. 9, 2006.

International Preliminary Report on Patentability dated May 14, 2008, for PCT/US06/043856, filed Nov. 9, 2006.

International Search Report dated Dec. 4, 2008, for PCT/US08/064871, filed May 27, 2008.

Written Opinion of the ISA dated Nov. 25, 2009, for PCT/US08/064871, filed May 27, 2008.

International Preliminary Report on Patentability dated Dec. 1, 2009, for PCT/US08/064871, filed May 27, 2008.

International Search Report dated Apr. 9, 2008, for PCT/US07/025309, filed Dec. 11, 2007.

Written Opinion of the ISA dated Jun. 11, 2009, for PCT/US07/025309, filed Dec. 11, 2007.

International Preliminary Report on Patentability dated Jun. 16, 2009, for PCT/US07/025309, filed Dec. 11, 2007.

Belohlav, "Understanding Brazing Fundamentals," The American Welder, Sep.-Oct. 2000; Jul. 11, 2008; <http://www.aws.org/wj/amwelder/9-00/fundamentals.html>.

International Preliminary Report on Patentability dated Dec. 11, 2008, for PCT/US07/69636, filed May 24, 2007.

Written Opinion dated Nov. 8, 2007, for PCT/US07/69636, filed May 24, 2007.

* cited by examiner

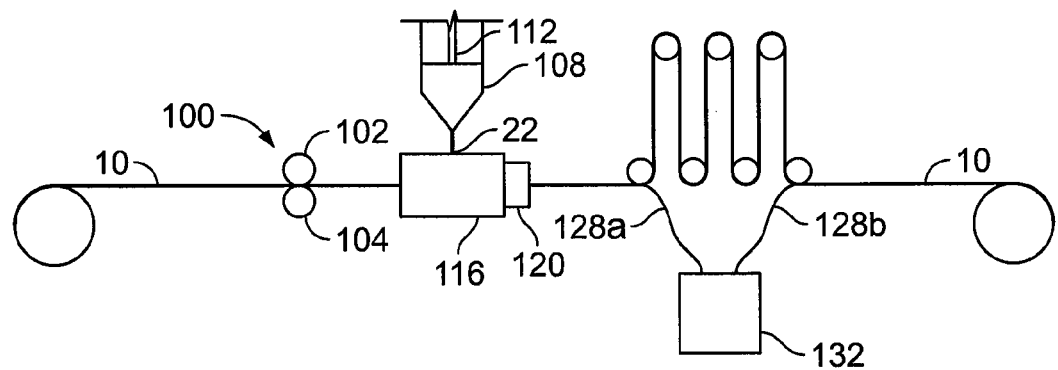
FIG. 10
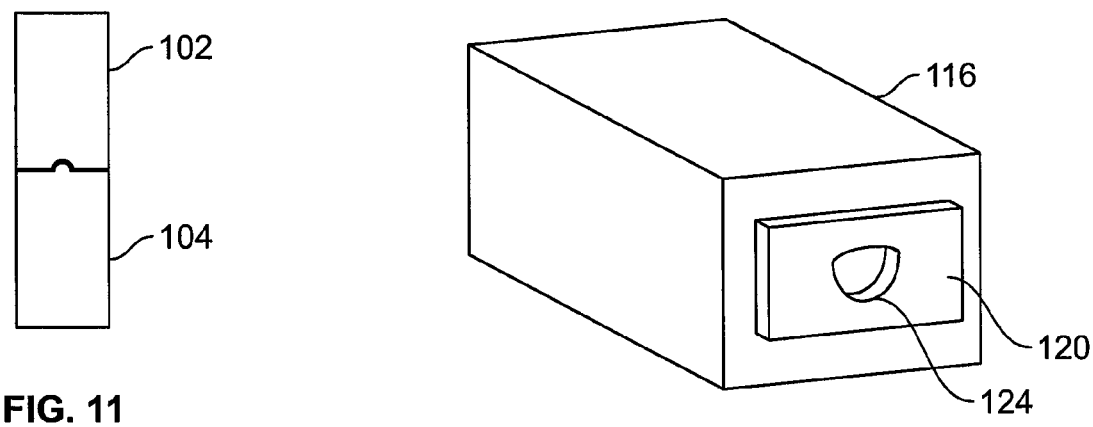
FIG. 11
FIG. 12
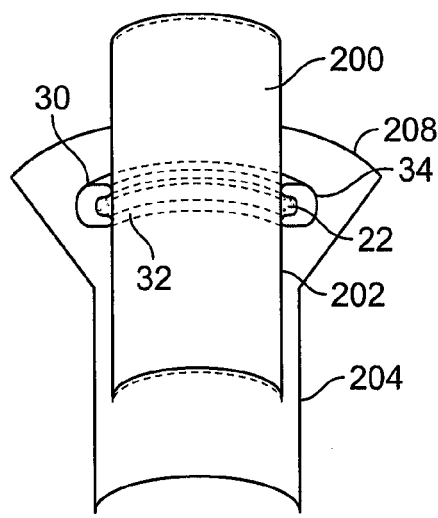
FIG. 13

FILLER METAL WITH FLUX FOR BRAZING AND SOLDERING AND METHOD OF MAKING AND USING SAME

RELATED APPLICATION

This Application is a continuation-in-part of application Ser. No. 11/753,045, filed on May 24, 2007 which claimed the benefit of Provisional Patent Application Ser. No. 60/808,416 filed on May 25, 2006.

TECHNICAL FIELD

The invention relates to relates to wire used in brazing and soldering. More particularly, the present invention is directed to a channeled wire having a flux solution deposited therein for use in joining two similar or dissimilar metals in industrial applications.

BACKGROUND OF THE INVENTION

Brazing and soldering are two methods commonly used to join two similar or dissimilar metals together. These processes typically involve joining metal components together by disposing a brazing composition such as an aluminum or metal alloy adjacent to or between the faying surfaces, i.e., the surfaces to be joined. The brazing filler alloy and the faying surfaces are then heated to the brazing temperature, typically above the melting temperature of the braze alloy but below the melting temperature of the components to be joined. The brazing composition then melts, flows into the joint by capillary action and forms a fillet and seal that bonds the faying surfaces.

In most cases, these processes require a chemical flux in addition to the filler alloy. The flux prepares the base metals to accept the filler alloy which results in a strong bond. Fluxes are generally grouped under two categories: corrosive (must be removed) and non-corrosive (residues are left on the part).

Historically, the alloy and flux are applied as two separate steps. In recent years however, an increasing number of options have been developed that combine the filler alloys and fluxes in one complete form. These developments have taken place with brazing alloys that are aluminum based and silver based.

For instance, Omni Technologies Corporation (Epping, N.H.) developed a flux core wire, which is sold under the trademark SIL-CORE™. In order to accomplish this, Omni takes aluminum in the form of narrow sheet, deposits a quantity of powdered flux down the middle, and then form rolls the narrow sheet around the flux. This material is then put through draw dies to reduce the diameter and compact the flux inside. From this process, Omni offers several wire diameters as well as different flux compositions. In addition, the amount of flux can be changed as needed. This material is available on spools, large coils and custom fabricated shapes. The inventors of the present invention believe Omni uses a flux sold by Solvay Chemical Company under the name NOCOLOK®. NOCOLOK® brand is one of the most widely recognized non-corrosive aluminum fluxes. This product is described in U.S. Pat. No. 5,781,846, which is hereby incorporated by reference as if fully set forth herein. Omni claims the SIL-CORE™ product does not contain a binding agent.

The S.A. Day Corporation (Buffalo, N.Y.) produces an aluminum flux coated rod sold under name DAYROD. This rod includes an aluminum wire cut to 12 inch rods, and dipped in an aluminum flux bath. After dipping, the rods are hung to dry. Day does not use NOCOLOK® brand flux. Instead, Day uses a similar formulation which is mixed with a polymer-based binder system. This binder allows for the flux to remain ductile and not brittle. The flux coated rods can be bent or twisted and the flux will not fall off.

Day also produces a flux coated ring. Day purchases metallic rings from Bellman-Melcor, Inc. The rings are then loaded on a machine that "paints" a thin coating of flux on the outside edge of each ring. While the end product is acceptable, it is very slow to produce and consequently very expensive. Similar to the rods, the rings can be handled roughly and the flux remains intact.

Protechno-Richard (France) offers a product very similar to the Omni product.

Kin-Met (Korea) produces an extruded product. A powdered form of aluminum braze alloy is mixed with powdered flux. The combination is pressurized and extruded into final form.

Wolverine and Omni teamed up to create a flux coating for silver based materials. Made from a ductile binder system, this technology is sold under the name SILVACOTE™. SILVACOTE™ is a continuously coated, flux-coated brazing material.

The present invention is provided to solve the problems discussed above and other problems, and to provide advantages and aspects not provided by prior brazing wires of this type. A full discussion of the features and advantages of the present invention is deferred to the detailed description, which proceeds with reference to the accompanying drawings.

SUMMARY OF THE INVENTION

The present invention is directed to a wire for use in a brazing or soldering operation. The wire comprises an elongated body, a channel, and a flux solution. The elongated body is produced from a metallic material. The body has an outer surface. The channel is formed along at least a portion of the body. The channel has an opening. The flux solution is deposited within the channel and along the length of the body with a surface of the flux solution being exposed through the opening in the channel.

The metallic material may be an aluminum alloy, a silver alloy, a copper alloy, and/or a zinc alloy.

The elongated body may have a substantially elliptical cross-sectional shape, a substantially rectangular shape cross-sectional shape, and or a substantially kidney-shaped cross-sectional shape.

The channel may have a substantially rectangular shape.

The flux solution may be a non-corrosive or corrosive flux solution.

The flux solution may include a polymer-base binder.

The opening may be about 0.030 inches.

The opening may be about 30% to 70% of a major axis of the wire.

The channel may be about 0.020 inches deep.

The channel may have a depth of about 10% to 50% of a major axis of the wire.

The elongated body may be formed into an annular ring having an inner wall and an opposing outer wall. The channel may form a portion of the inner wall. The flux solution within the channel may form a portion of the inner wall, and a top surface of the flux solution within the channel may be located below a straight line or imaginary plane spanning across the opening of the channel. The straight line may be located entirely along the inner wall of the ring.

The present invention is also directed to a wire for use in a brazing or soldering operation. The wire comprises an elongated body, a channel, and a flux solution. The elongated body is of a metallic material. The body has a length substantially greater than a width. The elongated body also has an outer surface. The channel is formed along a portion of the length of the body and has an opening. The flux solution is deposited within the channel and along the portion of the length of the body. The flux solution covers a portion of the outer surface. A portion of the flux solution is exposed through the opening in the channel.

The invention is further directed to a method of preparing a wire for use in a brazing or soldering operation. The method comprises the steps of providing an elongated wire, forming a channel along at least a portion of the length of the elongated wire, and depositing a flux solution into the channel. The elongated wire has a length substantially greater than a cross-sectional width and an outer exposed surface. The channel has an opening. The flux solution is deposited into the channel such that a portion of the flux solution is exposed in the opening.

The channel may span substantially the entire length of the elongated wire.

The opening may span substantially the length of the elongated wire.

The flux solution may comprise a metallic component and a polymeric-based component.

The polymeric-based component may be an acrylic polymer.

The metallic material may be an aluminum-based powder.

The invention is also directed to a further method of preparing a wire for use in a brazing or soldering operation. This method comprises the steps of: providing an elongated wire having a length substantially greater than a cross-sectional width and an outer exposed surface; forming a channel along at least a portion of the length of the elongated wire, the channel having an opening; depositing a flux solution through the opening into the channel wherein a portion of the outer surface of the elongated wire is covered by the flux solution and a portion of the flux solution is exposed in the opening; and curing the flux solution within the channel.

The method may comprise the further steps of: cutting the elongated wire to a predetermined length after the curing step; and forming an annular ring of the elongated wire. The forming the annular ring step may comprise the sub-step of creating an inner wall and an opposing outer wall, the inner wall including the channel containing the flux solution.

The depositing the flux solution step may also comprise the following sub-steps: providing a chamber including a volume of the flux solution; passing the elongated wire through an inlet in the chamber; removing the elongated wire from the chamber through an outlet in the chamber; and passing the wire through a die located adjacent the outlet; the die having a passageway therethrough wherein the shape of the passageway regulates the amount and location of the flux solution left on the elongated wire.

The curing step may include the step of: providing a source of power; and electrically connecting the elongated wire to the source of power.

Another aspect of the present invention is directed to a wire for use in a brazing or soldering operation. The wire comprises an elongated body of a metallic material, a channel formed along a length of the elongated body, the channel having an opening, and a flux solution within the channel, the flux solution comprising a flux material and binder material.

The binder material may be a polymer-base material. The polymer-base material may comprise a polymer selected from a group consisting of an acrylic polymer and a polymer produced from copolymerization of carbon dioxide. The polymer may be a poly alkylene carbonate.

The flux material may be aluminum-based or cesium-based.

The metallic material of the elongated body may be an aluminum alloy, or the metallic material may be a zinc/aluminum alloy comprising at least having at least 2 percent by weight aluminum.

Another aspect of the invention is directed to a wire for use in a brazing or soldering operation. The wire comprises an elongated body, a first channel, a second channel, a first volume of a first flux solution, and a second volume of a second flux solution. The elongated body is produced from a metallic material. The first channel has a first opening formed along a length of the elongated body. The second channel has a second opening formed along a length of the elongated body. The first volume of a first flux solution is located within the first channel and along at least a portion of the length of the elongated body. The second volume of a second flux solution is located within the second channel and along at least a portion of the length of the elongated body.

This aspect of the invention may include several other design chracteristics, alone or in any combination. For instance, the first volume of the first flux solution and the second volume of the second flux solution of the wire of this aspect of the invention may not be equal. Also, the top surface of the first volume of the first flux solution may be located below an imaginary plane spanning across uppermost points forming the first opening in the first channel. Each channel may comprise a pair of sidewalls separated by a base, each sidewall extending radially outwardly from the base and forming an angle with the base greater than 90 degrees. The first flux solution and the second flux solution may have different chemistries. The openings in the first and second channels may be parallel or transverse to a central axis of the wire. The wire may form a ring and the first channel is located along a radially inner wall and the second channel is located along a radially outer wall. The first and second flux solutions may comprise a flux material and binder material. The metallic material of the elongated body may be an aluminum alloy. A surface of the first flux solution may be exposed through the opening in the first channel. A surface of the second flux solution may be exposed through the opening in the second channel. The opening in the first channel may be 30% to 70% of the length of a major axis of the wire. The second channel may be 30% to 70% of the length of a major axis of the wire. The first and second channels may be transverse to a central axis of the wire.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 10 is a schematic view of a manufacturing method of forming a wire of the present invention;

FIG. 11 is a partial cross-sectional view of a pair of work rolls for rolling a channel into an elongated wire;

FIG. 12 is a perspective view of a flux solution chamber and a die/wiper for removing excess flux solution on a wire pf the present invention;

FIG. 13 is a cross-sectional view of a method for joining a pair of tubular members using a wire of the present invention formed as an annular ring.

DETAILED DESCRIPTION

Figure 1:
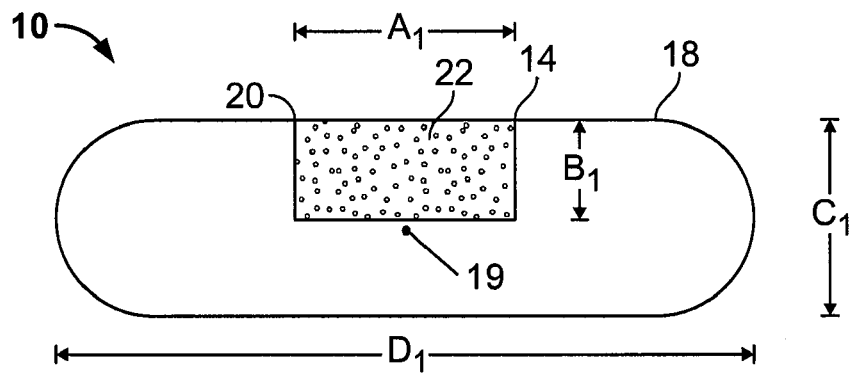
FIG. 1 is a cross-sectional view taken transverse to the length of a first braze wire of the present invention.
Figure 2:
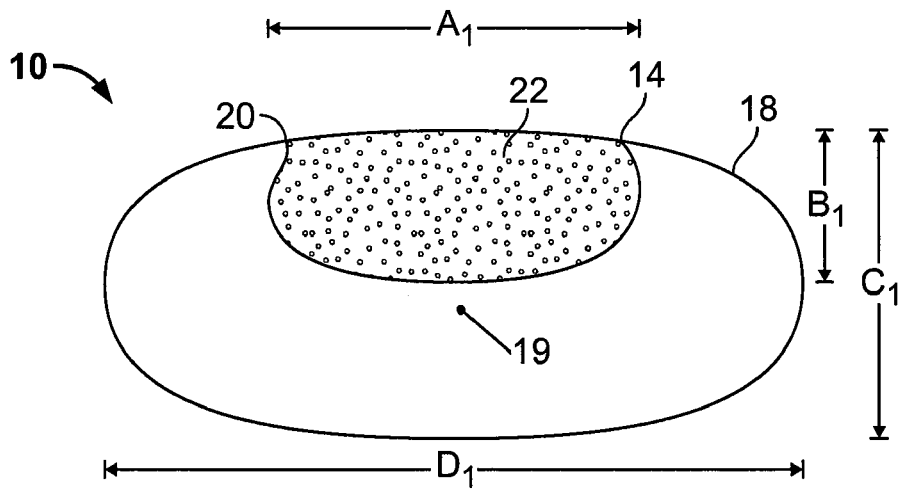
FIG. 2 is a cross-sectional view taken transverse to the length of a second braze wire of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a brazing/soldering wire for use in multiple metal combinations including aluminum applications. The end use for these materials is typically industrial applications, such as automobiles and automobile component manufacturing as well as other heat transfer applications including air conditioning and refrigeration manufacture. Of course, other applications can be had as well. The brazing/soldering wire of the present invention may be used on many different materials including aluminum alloys, zinc alloys, copper alloys and silver alloys, etc. The wire itself can be produced from an aluminum alloy, a silver alloy, a copper alloy, and/or a zinc alloy.

The Wire

The present invention includes a solid wire 10 rather than a narrow sheet or strip that is preferably very robust and will not move when assembled onto component parts. This is important because in air conditioning applications, braze wire is commonly supplied in ring-form. The rings are friction fit or snuggly placed around tubes. Because current ring shaped braze wires often lose their grip on component parts, causing the rings to shift or fall off altogether, rings formed from the wire 10 of the present invention are specifically constructed so as to be less likely to plastically deform by the friction fit about the component parts. As a result, they are less likely to shift or fall off prior to the brazing or soldering process. This important aspect of the present invention is described in more detail below.

Referring to FIGS. 1 though 5, a wire 10 having an elongated body 12 with a channel 14 reformed along a length of an outer surface 18 is illustrated. The wire 10 is formed from a metallic material supplied at a diameter of about 0.031 inches to 0.125 inches (0.787 mm to 3.18 mm), preferably 0.079 inches to 0.090 inches (2.00 mm to 2.29 mm), or any range or combination of ranges therein. The wire 10 has been rolled or reformed to a new geometric shape, such as substantially rectangular or elliptical configuration having a major axis $D_1$ of about 0.105 inches (2.67 mm) and a minor axis $C_1$ of about 0.048 inches (1.22 mm). The overall shape of the reformed wire 10 may also be described as kidney-shaped, U-shaped, or C-shaped in cross-section. A discontinuity 20 in the outer surface 18 and, thus the shape of the wire 10, is caused by the channel 14 formed therein. It would be appreciated by one of ordinary skill in the art that dimensions of the wire 10 may vary greatly based on customer requirements.

The channel 14 typically has a substantially rectangular or conic section shape having an opening $A_1$ parallel to a central axis 19 of the wire 10 of about 0.030 inches (0.76 mm) and a depth $B_1$ of about 0.020 inches (0.51 mm). Preferably, the opening $A_1$ is about 30% to 70% of the starting diameter of the wire or a major axis of the reformed wire, and the channel 14 has a depth $B_1$, about 10% to 50% of the starting diameter of the wire or a major axis of the reformed wire. Again, it would be appreciated by one of ordinary skill in the art that dimensions of the channel 14 may vary greatly based on customer requirements.

Figure 3:
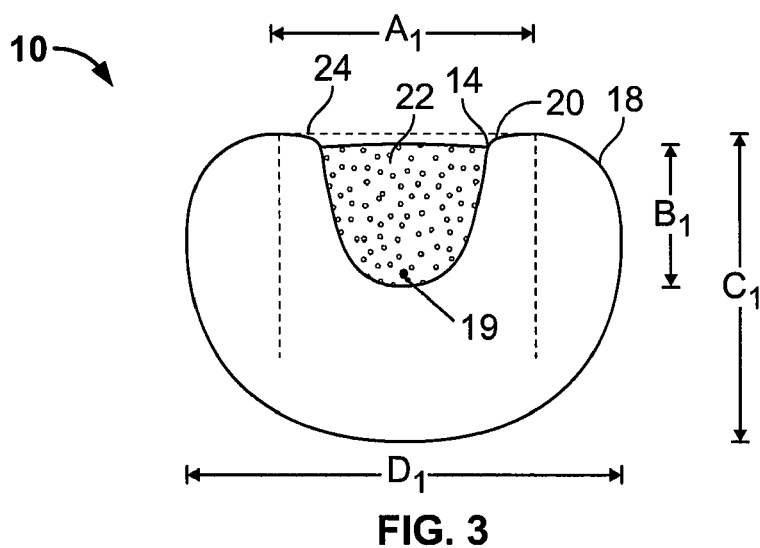
FIG. 3 is a cross-sectional view taken transverse to the length of a third braze wire of the present invention.
Figure 4:
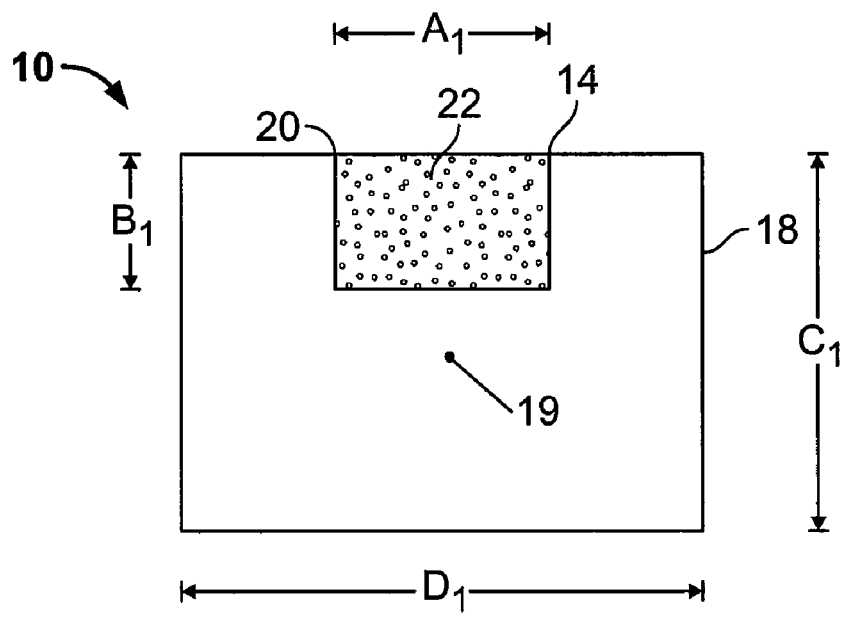
FIG. 4 is a cross-sectional view taken transverse to the length of a fourth braze wire of the present invention.
Figure 5:
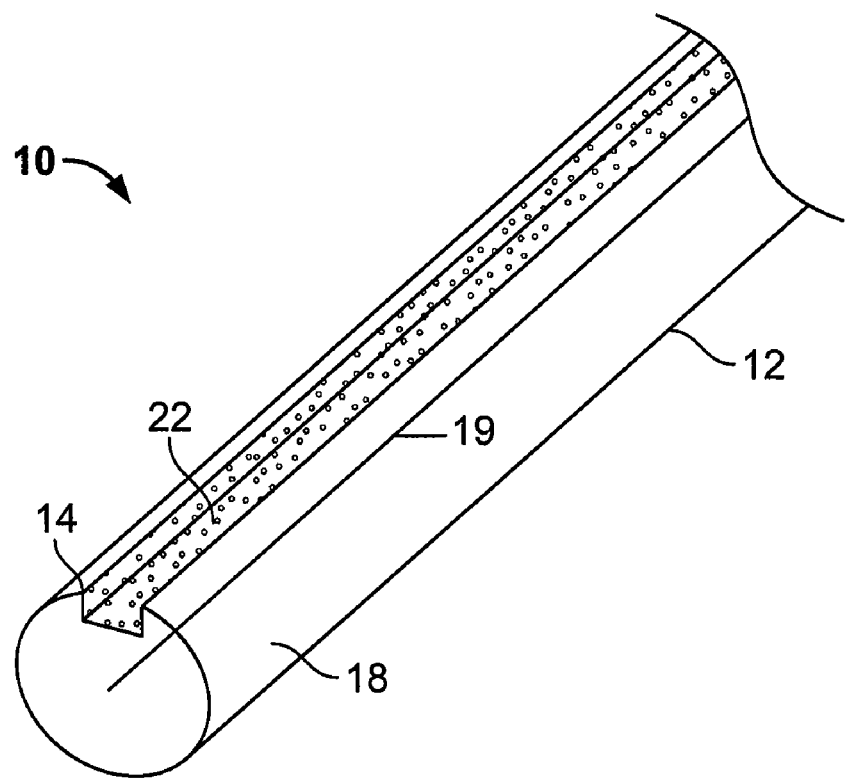
FIG. 5 is a perspective view of a lengthwise section of a typical braze wire of the present invention.

The channel 14 is at least partially filled with a volume of flux solution 22. The volume of flux solution 22 per length of the wire 10 is determined by the end use for the wire. However, it is preferable for the entire volume of flux solution 22 to be positioned within the channel 14 and for the flux solution to be exposed through the opening in the channel 14. Thus, the remaining portions of the outer surface 18 of the wire are free of flux solution 22. A top surface of the flux solution 22 is preferably located below an imaginary line or plane 24 spanning the uppermost surface of the opening $A_1$ of the channel 14. (See FIG. 3).

The flux solution 22 preferably comprises a polymer-based binder combined with a flux material. Because the flux solution 22 includes a polymer-based binder, the wire 10 may be manipulated into virtually any shape without disturbing the flux solution 22. Thus, the wire 10 of the present invention may be provided on spools, coils, straight rods and most importantly made to order custom performs, such as rings and the like. The wire 10 may further be supplied in unlimited wire sizes with different flux formulations as well as different alloy/flux ratios.

Figure 6:
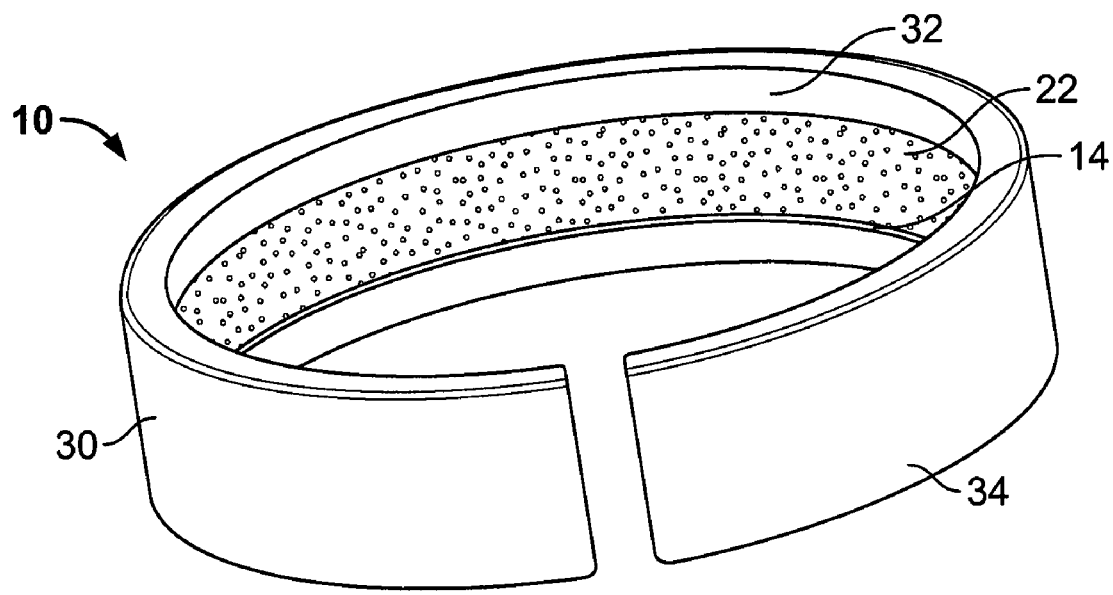
FIG. 6 is a perspective view of a wire of the present invention formed into an annular ring.
Figure 7:
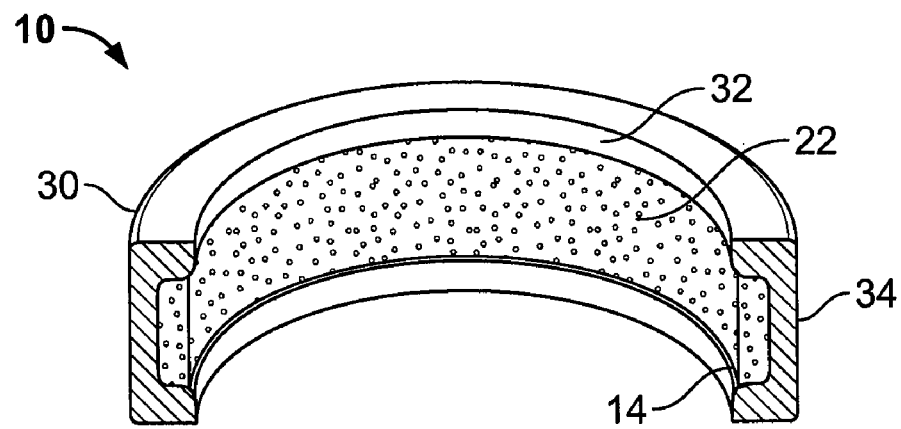
FIG. 7 is a cross-sectional view of the annular ring of FIG. 6.

Referring to FIGS. 6-7, a wire 10 of the present invention has been formed into a pre-form. The pre-form may be a rod, slug, or any other custom shape. In the embodiment illustrated the pre-form is an annular ring 30. The ring 30 is formed such that the channel 14 bearing the flux solution 22 forms an inner wall 32 of the ring 30. An outer wall 34 of the ring 30 is free of flux solution 22. By locating the flux/polymer solution 22 on the inner wall of the ring 30, two advantages are realized. First, the flux, within the flux solution 22, is located adjacent one of the parts to be joined. Second, the flux solution 22 is in compression, rather than tension, wherein the solution 22 tends to remain within the channel 14 rather than flaking, pealing, or otherwise falling off of the wire 10.

Further to the structure of the inner wall of the ring 30, the imaginary straight line or plane 24, of which the top surface of the flux solution 22 is preferably below, is located entirely along the inner wall 32 of the ring 30. Thus, the opening $A_1$ of the channel 14 is also located entirely along the inner wall 32 of the ring 30. In other words, the flux solution 22 forms a portion of the inner wall 32. More particularly, the top surface of the flux solution 22 forms at least a portion of the inner wall 32.

Figure 8:
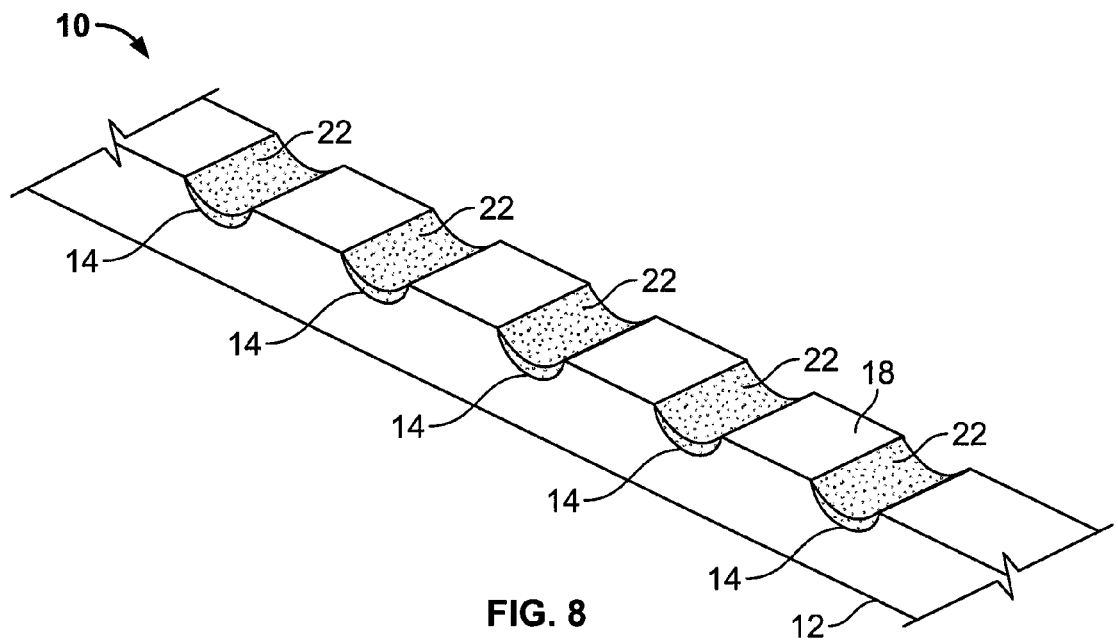
FIG. 8 is a perspective view of a lengthwise section of a typical braze wire of the present invention.

Referring to FIG. 8, an alternative embodiment of a wire 10 of the present invention is illustrated. In this embodiment, a plurality of channels 14 are formed in the wire 10. The channels 14 are formed along a transverse length of the elongated body 12, such that openings are transverse to the central axis 19 of the wire 10. In other words, the length of the wire 10 forming the channel 14 is transverse to the elongated body 12 of the wire 10. Each channel 14 is otherwise as described above, each channel 14 being at least partially filled with a flux solution 22, preferably filled to a height below the imaginary line or plane 24. The shapes and dimensions of the wire 10 are, likewise, as described above.

Figure 9:
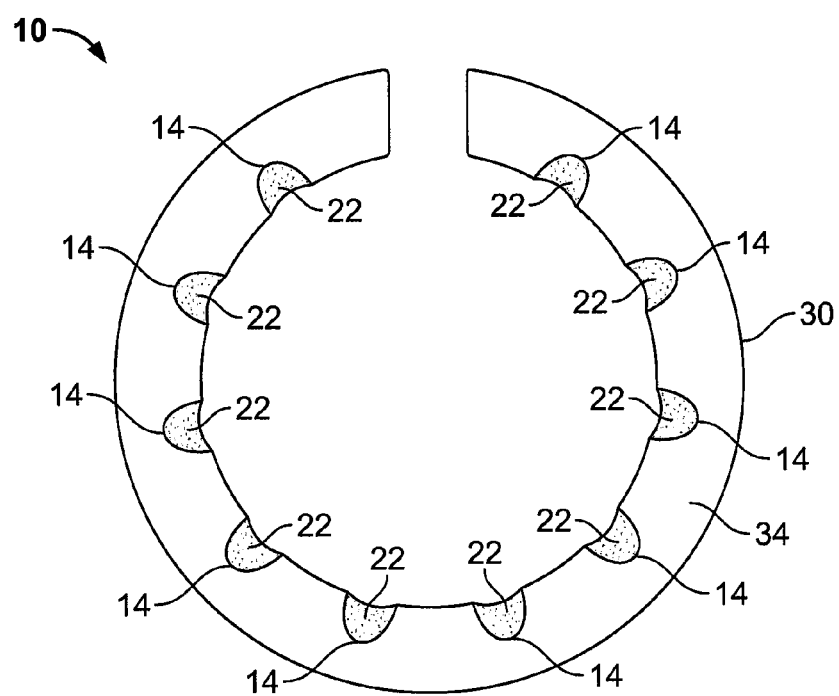
FIG. 9 is a top view of the braze wire of FIG. 8 formed in the form of an annular ring.

FIG. 9 is an illustration of the wire 20 of FIG. 8 reformed to an annular ring 30. The ring 30 is formed such that the channel 14 bearing the flux solution 22 forms an inner wall 32 of the ring 30. In this example, the outer wall 34 of the ring 30 includes a section or portion of each channel 14 and thus the flux solution 22 within each channel 22 also forms a portion of the outer wall 34 of the ring 30. This configuration achieves the advantages of the previous embodiment as well as the additional benefit that upon melting or liquefying, the flux in the flux solution 22 is free to flow from each channel 14 in a direction transverse to the length of the elongated body 12. It would be appreciated by one of ordinary skill in the art that the channels 14 may be completely contained along the inner wall 32 of the ring, similar to the single channel 14 of the FIGS. 6-7, or that some percentage of the channels 14 may be completely contained along the inner wall 32 of the ring 34 with some percentage of the channels 14 forming a portion of both the inner and outer walls 32,34 of the ring. It would be still further appreciated by one of ordinary skill that some percentage of the channels 14 may be completely contained on the inner wall 32, that some percentage of the channels 14 may be completely contained on the outer wall 34, and that some percentage of the channels 14 may form a portions of the inner and outer wall 32,34 of the ring 30. In other words, the channels 14 may be distributed about the circumference of the outer surface 18 of the elongated body 12.

Figure 14:
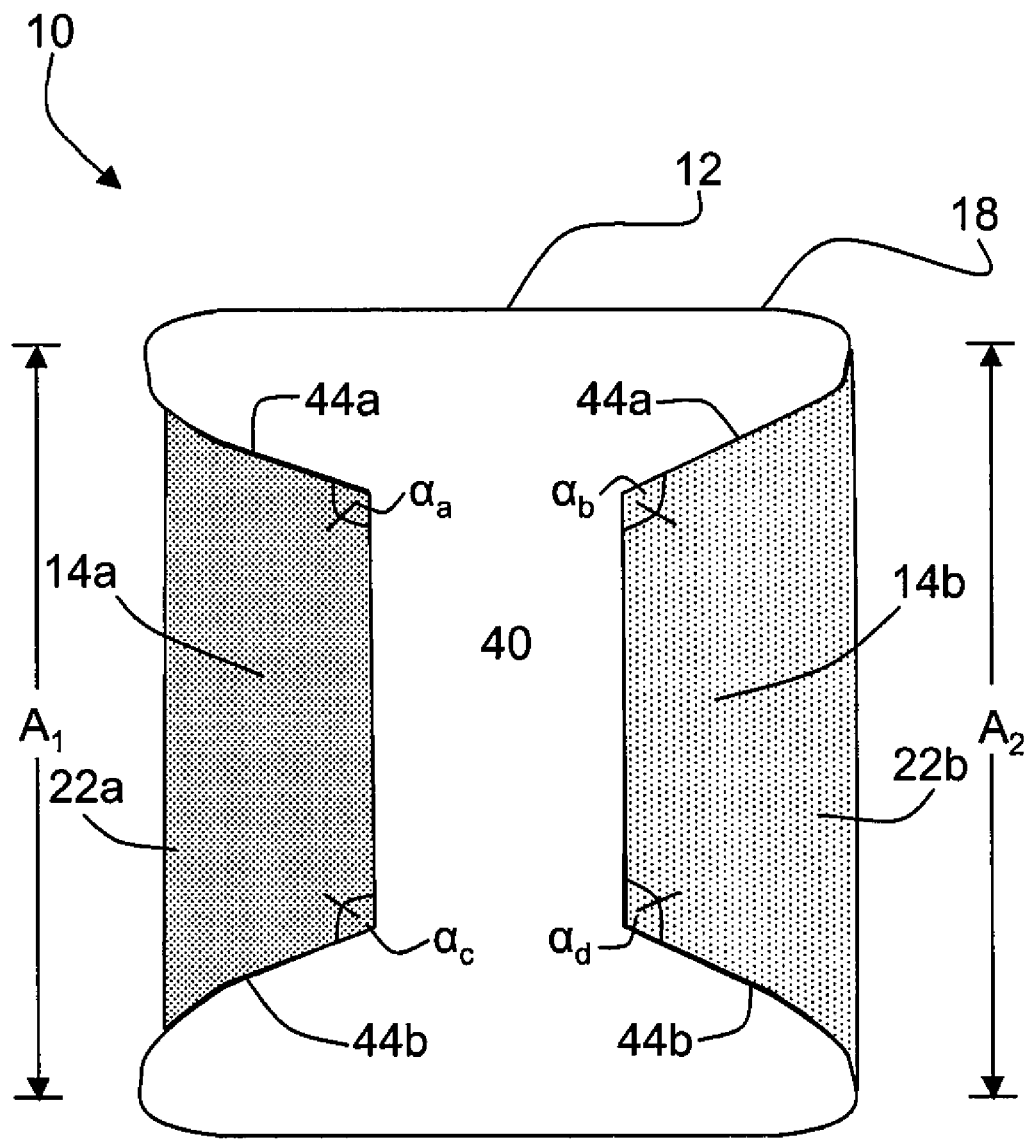
FIG. 14 is a cross-sectional view of an alternative embodiment of the braze wire of the present invention.

Now referring specifically to FIG. 14, another alternative embodiment of the wire 10 of the present invention is illustrated. The dimensions of the wire 10 of this embodiment are the same or similar to the dimensions previously discussed. This wire 10 includes a plurality of channels, preferably two. Accordingly, the wire has an elongated body 12 which includes at least two channels 14a,14b located lengthwise along the outer surface 18 of the wire 10. These channels 14a,14b are separated by a portion of the outer surface 18 and are preferably located on opposing sides of the wire 10. Thus, the channels 14a,14b may be spaced 180 degrees apart and may spiral about the outer surface 18.

Each channel 14a,14b forms a separate discontinuity 20a, 20b in the outer surface 18 and has a base 40 joining a pair of opposing sidewalls 44a,44b. The discontinuities 20a,20b alter the outer surface 18 and, thus the shape of the wire 10. It would be appreciated by one of ordinary skill in the art that dimensions of the wire 10 may vary greatly based on customer requirements. Furthermore, the channels 14a,14b may have disparate volumes or may have equal volumes depending on end use requirements, and/or the volume of flux required. In other words, the ratio of the flux to the wire volume may be varied from channel to channel. Moreover, the chemistry of the flux in one channel may be varied comparatively to the chemistry of the flux in a second channel.

The base 40 is generally planar as illustrated but may be curved or bowed, either convexly or concavely or some combination thereof. The sidewalls 44a,44b angle radially outwardly from the base 40 such that the sidewalls 44a,44b form angles $\alpha_a,\alpha_b,\alpha_c,\alpha_d$ with the base 40. The angles $\alpha_a,\alpha_b,\alpha_c,\alpha_d$ may be less than, equal to, or greater than 90 degrees. Preferably, the angles $\alpha_a,\alpha_b,\alpha_c,\alpha_d$ are greater than 90 degrees; more preferably, the angles $\alpha_a,\alpha_b,\alpha_c,\alpha_d$ are between 90 and 150 degrees; and most preferably, the angles $\alpha_a,\alpha_b,\alpha_c,\alpha_d$ are between 90 and 120 degrees; the angles $\alpha_a,\alpha_b,\alpha_c,\alpha_d$ may be any range or combination of ranges therein, collectively (all equal) or individually (disparate values or some combination of equal and unequal values).

The channels 14a14b are at least partially filled with separate volumes of flux solution 22a,22b. The volume of flux solution 22a,22b per length of the wire 10 is determined by the end use for the wire 10. However, it is preferable for the entire volume of flux solution 22a,22b to be positioned within the channels 14a,14b and for the flux solution to be exposed through the opening in the channel 14. Thus, the remaining portions of the outer surface 18 of the wire 10 are free of flux solution 22. A top surface of the flux solution 22a,22b may be located above, below, or co-planar with the an imaginary line or plane spanning the uppermost surface of the opening $A_1,A_2$ of each channel 14a,14b. Of course, the separate top surfaces of the flux solution 22a,22b in the first and second channels 14a,14b respectively, may have different heights as shown in FIG. 14.

There are several advantages of the wires of the present invention. For example, the raw material is cheaper and the process speed is significantly faster than any other product combining wire and flux. As compared to the Omni product, the wires 10 of the present invention include a flux solution which is exposed along a length of the wire 10. The flux solution 22 is not encased. As a result, this allows the flux within the flux solution 22 to melt and release from the wire prior to the alloy of the wire melting.

The Flux Solution

The flux solution 22 is preferably prepared in the following manner. A granulated or beaded polymer is first dissolved in a solvent to form a liquefied suspension. The polymeric material may be derived from an acrylic polymer, such as a proprietary acrylic polymer manufactured by S.A. Day Mfg. Co. The polymeric material, however, is preferably derived from a carbon dioxide rather than a petroleum; it is enzyme degradable; and it is biocompatible where thermal decomposition yields a carbonate which vaporizes for complete removal, leaving minimal ash residue. The products of combustion are non-toxic (primarily carbon dioxide and water). Accordingly, the polymer is generally a thermoplastic, preferably a copolymer, more preferably a poly alkylene carbonate produced through the copolymerization of $CO_2$ with one or more epoxides.

Once the polymer is dissolved in the solvent, a flux is then added in powder form. Any suitable flux, corrosive and non-corrosive, can be used depending on the desired end use. The resulting solution is a thick, homogeneous mixture having a paste-like consistency similar to caulk.

The Method of Manufacture

As illustrated in FIGS. 10-12, the channel 14 (or channels 14a,14b) is formed by a roll forming operation. A rolling mill 100 having an upper roll 102 and a complementary lower roll 104 imparts a specific, pre-designed shape to the wire 10. The profile of the upper and lower rolls 102,104 is determined by the characteristics desired by the rolled wire, i.e. designed to accommodate a specific volume of flux required per length of wire or flux/wire metal ratio. In short, the profiles of the complementary rolls 102,104 form the wire's profile at the bite of the rolls 102,104, and the rolls 102,104 may be changed for different profiles desired.

As the wire 10 exits the rolling operation, the flux solution 22 (or flux solutions 22a,22b) is added to the channel 14. This is accomplished by inserting the flux solution 22 within a dispensing cartridge 108. An external source of pressure, shown schematically at reference number 112, forces the solution 22 from the cartridge 108 to a holding chamber or die chamber 116 wherein a bath of the solution 22 is generated within the chamber 116. The amount of flux solution 22 forced from the cartridge 108 to the chamber 116 is controlled by a metering device.

The reformed wire 10 enters the chamber 116 through an opening at one end of the chamber 116 so that the solution 22 coats the entire surface of the wire 10. The solution 22 also enters the channel 14 through the opening $A_1$ and fills, or partially fills, the channel 14 on the wire's outer surface 18. The coated wire 10 then exits the chamber 116 through a rubber wiper or die 120 which includes a shaped opening or passageway 124. Excess solution 22 is wiped or cleaned as the wire 10 exits the chamber, leaving only the desired amount of flux solution 22 on the wire 10, preferably only within the channel 14. In other words, the die controls the amount of solution left within the channel 14, distributes the solution 22 evenly within the channel, and ensures no excess solution 22 remains on the wire 10.

Once the channel 14 is filled with the desired volume of solution 22, the solution is dried or cured to form a solid within the channel 14. Any number of methods may be used, including ultra-violet, infra-red, heated fluid pressure, etc. In this embodiment, electrodes 128a,128b are electrically connected to the coated wire 10 wherein an electric current from a source of power 132 heats the wire 10 to the desired temperature, generally between 100° F. to 250° F. (38° C. to 121° C.), preferably between 125° F. to 175° F. (52° C. to 79° C.), most preferably 150° F. (66° C.), or any range or combination of ranges therein.

Once the solution is sufficiently dried, the wire 10 is spooled for delivery or further process.

Method of Use

An example of the present invention is illustrated in FIG. 13. A first tubular metallic part 200 is to be joined to a second tubular metallic part 204. The first tubular part 200 is passed through a ring 30 formed of the finished wire, such as the annular ring 30 illustrated in FIGS. 6-7 and 9. The flux-laden channel 14 of the ring 30 is located adjacent an outer surface 202 of the first tubular part 200. The second tubular part 204 has a radially outwardly flared flange 208 to aid in guiding an end portion of the first tubular part 200 into the second tubular part 204. Unlike rings of the prior art, the flow of the flux from the ring 30 of the present invention is not restricted and flows freely upon heating so as to permit joining of the first and second tubular parts 200,204 once the alloy of ring 30 melts.

In a second example, the ring 30 described in conjunction with the previous example is an aluminum soft temper alloy such 4047 aluminum. The first and second tubular parts 200, 204 are produced from aluminum or an aluminum alloy. The flux solution 22 is produced by dissolving QPAC® polymer beads manufactured by Empower Materials Inc. in a methyl ethyl ketone (MEK) solvent. The flux is a non-corrosive aluminum flux such as the aluminum potassium fluoride NOCOLOK® having a melting temperature of about 1049° F. to 1062° F. (565° C. to 572° C.) or flux B sold by S.A. Day Mfg. Co. containing potassium tetrafluoroaluminate and cesium tetrafluoroaluminate having a melting temperature of about 1055° F. (560° C.).

The MEK solvent is particularly useful. MEK solvent is highly evaporative so a low heat will cure the solution 22. Thus, the flux of this example can be liquefied and released from the flux solution 22 within the desired range of between 100° F. (38° C.) and 250° F. (121° C.), most preferably about 150° F. (66° C.), or any range or combination of ranges therein. These ranges will sufficiently evaporate the solvent without causing the remaining flux/polymer mix 22 to become brittle.

In a third example, the tubular parts 200,204 are of aluminum or an aluminum alloy having a melting temperature of about 1150° F. to 1200° F. (620° C. to 650° C.). The wire is produced from a zinc/aluminum alloy having a melting temperature of about 850° F. to 950° F. (454° C. to 510° C.), such as an alloy comprising at least about 2% aluminum, preferably about 65% to 85% zinc and 15% to 35% aluminum, and most preferably 78% zinc and 22% aluminum and having a melting temperature of about 900° F. (482° C.), or any range or combination of ranges therein. The channel 14 is filled with a polymer/flux blend 22 which activates at about 788° F. to 900° F. (420° C. to 482° C.), preferably a polymer as described above with a cesium-based flux in the amount of about 56% to 66% cesium, 27% to 32.2% fluorine, and 8.6% to 11.4% aluminum or about 6.4% silicon, or any range or combination of ranges therein. Most preferably, the flux solution 22 includes a cesium-based flux which has an activation temperature of about 865° F. (463° C.), such as those produced by Chemetall GmbH of Frankfurt, Germany.

While the specific embodiments have been illustrated and described, numerous modifications are possible without significantly departing from the spirit of the invention, and the scope of protection is only limited by the scope of the accompanying Claims.

What is claimed is:

1. A wire for use in a brazing or soldering operation, the wire comprising:
   an elongated body of a metallic material extending along a lengthwise central axis;
   a first channel extending lengthwise along the central axis having a first opening formed along a length of the elongated body;
   a second channel extending lengthwise along the central axis having a second opening formed along a length of the elongated body, wherein the first and second channels comprise a pair of sidewalls extending lengthwise along the central axis separated by a transverse base, each sidewall extending radially outwardly from the base and forming an angle with the base greater than 90 degrees;
   a first volume of a first cured flux solution within the first channel and along at least a portion of the length of the elongated body; and
   a second volume of a second cured flux solution within the second channel and along at least a portion of the length of the elongated body, wherein the first and second cured flux solutions are formed by curing a flux solution comprising a polymer-based binder material and a flux material.

2. The wire of claim 1 wherein the first volume of the first flux solution and the second volume of the second flux solution are not equal.

3. The wire of claim 1 wherein a top surface of the first volume of the first flux solution is located below a plane spanning across uppermost points forming the first opening in the first channel.

4. The wire of claim 1 wherein the first flux solution and the second flux solution have different chemistries.

5. The wire of claim 1 wherein the openings in the first and second channels are parallel to the central axis of the wire.

6. The wire of claim 1 wherein the wire forms a ring with the first channel forming at least a portion of a radially inner wall of the ring.

7. The wire of claim 1 wherein the polymer-based binder material comprises a polymer selected from a group consisting of an acrylic polymer and a polymer produced from copolymerization of carbon dioxide.

8. The wire of claim 1 wherein the polymer-based binder material is a poly alkylene carbonate.

9. The wire of claim 1 wherein the flux material is aluminum-based.

10. The wire of claim 1 wherein the flux material is cesium-based.

11. The wire of claim 1 wherein the metallic material of the elongated body is an aluminum alloy.

12. The wire of claim 1 wherein the metallic material is a zinc/aluminum alloy comprising at least 2 percent by weight aluminum.

13. The wire of claim 1 wherein a surface of the first flux solution is exposed through the opening in the first channel.

14. The wire of claim 13 wherein a surface of the second flux solution is exposed through the opening in the second channel.

* * * * *